Figure 1:
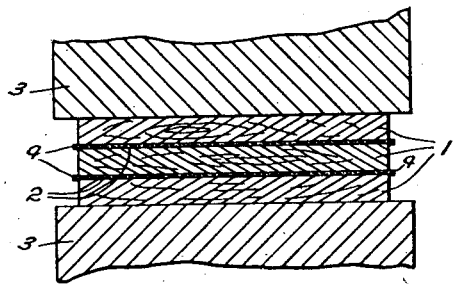

Jan. 15, 1946.  W. GALLAY ET AL  2,393,100

PRODUCTION OF LAMINATED STRUCTURES

Filed Aug. 6, 1943

Inventors:
W. Gallay and G. G. Graham

By Alex. E. MacRae
Attorney.

Patented Jan. 15, 1946

2,393,100

UNITED STATES PATENT OFFICE 2,393,100

PRODUCTION OF LAMINATED STRUCTURES

Wilfred Gallay and Gerald Gilbert Graham, Ottawa, Ontario, Canada, assignors to The Honorary Advisory Council for Scientific and Industrial Research, Ottawa, Ontario, Canada, a corporation of Canada Application August 6, 1943, Serial No. 497,648

2 Claims. (Cl. 144—309)

This invention relates to laminated materials and structures and to a method and means for constructing the same.

Laminated structures, such as plywood, are prepared by providing an adhesive between the various plies thereof and placing the assembled structure in a press during setting of the adhesive. The adhesives employed may be classified generally into two types or groups, namely, (1) cold-setting, and (2) hot-setting. A structure employing cold-setting type glues or adhesives of the natural variety, such as casein, requires many hours in the press for adequate gluing. Cold-setting type adhesives of the synthetic resin variety may be employed and such adhesives set in a shorter but still rather lengthy period of time but their use permits only a very brief period for assembling the structure. The permissible period between the time of spreading of a cold-setting synthetic resin adhesive on the plies and the time of final application of full pressure on the assembled plies is generally only about twenty minutes and seldom exceeds one hour under optimum conditions.

It is known that these cold-setting adhesives require several days for complete development of their optimum properties; in the case of the casein type uniform hydration and in the case of the synthetic resin type attainment of strength and water resistance.

If a heat-setting synthetic resin is used as the adhesive or glue, heat must be applied to the glue line or layer to effect curing, and the time required in the application of pressure is relatively brief. Manufacture of relatively thin laminated structures with hot-setting synthetic adhesives usually proceeds rapidly and conveniently in an ordinary hot plate press, heat being provided from platens heated by steam or electricity. However, if the thickness of the desired laminated structure is relatively great, it is obviously impossible to employ this means of heat application. Heretofore, therefore, it has been practicable to employ only cold press adhesives on assemblies in which the laminated structures are of a thickness greater than approximately one half inch. Recently the use of ultra short-wave heating has been proposed but the equipment is expensive.

It is an object of this invention to provide means whereby hot-setting synthetic resin adhesives may be employed in the manufacture of laminated structures of such thickness that sufficient heat could not be supplied thereto by heated platens or the like.

The invention contemplates broadly the provision of efficient electrical resistance means in the glue line of laminated structures whereby, on application of an electric current to such glue line, sufficient heat is generated therein to set the same. More specifically, the invention contemplates the addition to the adhesive of an electrical conductor which will not disturb appreciably the functions of the adhesive but which will provide resistance heating thereof at even low voltages of, for instance, 110 volts.

Figure 2:
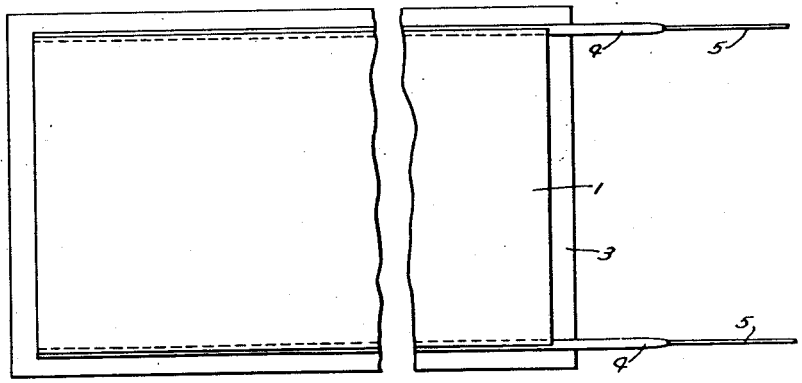
Figure 3:
Figure 4:
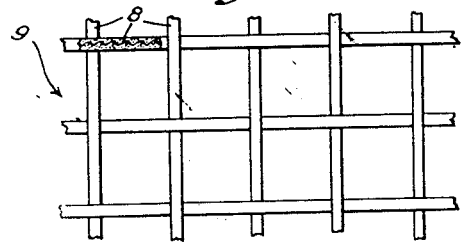
Figure 5:
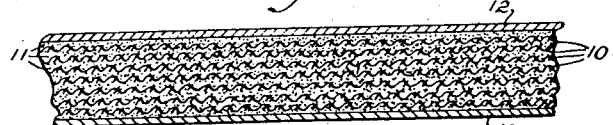

In the description of the invention to follow, the accompanying diagrammatic drawing will be referred to, in which, Figure 1 is a sectional elevation of a laminated structure in a press, Figure 2 is a plan view of the structure, Figure 3 is a sectional view in enlarged and somewhat exaggerated form of an adhesive film contemplated by the invention, Figure 4 is a greatly enlarged plan view of a conductive sheet constituting a heating element, and Figure 5 is a sectional elevation of another form of laminated structure.

In accordance with the invention, a material is added to the adhesive to render a thin layer thereof, such as is normally present between laminations, electrically conductive at ordinary voltages. The material is acetylene or like black. Acetylene black is a black obtained by thermal decomposition of acetylene into carbon and hydrogen with subsequent collection of the black and burning of the hydrogen (in the presence of the black) with air.

It has been found that such black imparts to the adhesive mass, in which it is incorporated, a conductivity and resistivity very much more effective in generating heat in the mass upon passage of an electric current of conveniently low voltage than other types of carbon or other materials which promote conductivity, and at the same time the proportions of this black required for the purpose of transforming electric current to heat energy do not interfere with the adhesive properties of the mass. In handling the acetylene black care must be taken to avoid changing or damaging its natural physical character.

One may use any desired thermosetting resin, such as phenol formaldehyde, urea formaldehyde and melamine or mixtures thereof or thermoplastic resins such as polyvinyl formal, polyvinyl butyral, or the like. The adhesive is usually used in the form of a dispersion of the resin in water, alcohol, toluene or the like. Water is the preferred dispersion agent as better conductivity is obtained than when alcohol, toluene or the like is used.

While the black may be added to the resin dispersion, it is preferable that it be pre-mixed with dry powdered resin, care being taken that injury to the acetylene black particles does not occur. The proportion of black to resin (dry basis by weight) may be from 20 to 100 parts black to 100 parts resin. A satisfactory proportion has been found to be 25 parts black to 100 parts resin.

The dry mixture is then suspended preferably in water, and the resultant paste is applied to the laminations by brushing, spraying or the like.

Referring to Figures 1 and 2, 1 represents the sheets of material, such as wood plies, to be laminated, 2 the glue or adhesive layers between the adjacent surfaces of the sheets, and 3 the press for applying pressure to the assembled structures. The wood plies to which the invention is particularly applicable have a thickness too great to permit adequate heat transfer therethrough by means of hot platens. The thickness normal to the plane of the plies through the plies in a structure will usually be three-eighths of an inch or greater. In making thick laminated structures using relatively thin plies it may not be necessary to render each glue line conductive. For example with thin plies sufficient heat may be provided by making alternative glue lines conductive.

While assembling the structure on the press, metallic strips 4, constituting electrodes, are inserted along two opposing edges of each conductive adhesive layer 2. For example, in the case of a glue line 10 feet long and 10 inches in width copper wire of 0.0253 inch in diameter (0.643 mm.) with unitary connections from the source of electric current has proven satisfactory in providing uniform heating throughout the glue line. The electrodes are connected to wires 5 of a suitable electrical circuit, not shown. During application of the desired pressure by the press, current is allowed to flow in the circuit, the applied voltage of which need not exceed 110. A temperature of 250°–270° F. in the adhesive line is reached in a few minutes and may be maintained for, say, three minutes. The completed laminated structure may then be removed from the press. The strength of such a structure, involving the employment of laminations of substantially any thickness, is equal to or greater than that of structures prepared in accordance with ordinary procedure.

The following is a specific example:

25 parts of acetylene black were thoroughly but gently mixed with 100 parts urea formaldehyde in the dry powdered form and the mixture was dispersed in water. The dispersion was then spread on birch sheets 10 inches wide and ¾ inch thick and the assembly of the same made in a press, as previously described. The electrodes were positioned along the glue lines as described and connected in an electrical circuit with a voltage of 220. A temperature of 250° F. was reached in the glue line in about five minutes and this temperature was maintained for another three minutes by continuing the current. The completed structure has a shear strength in the glue line of substantially 3000 lbs. per square inch.

The invention also contemplates the provision of a wood veneer adhesive of the film type wherein such film is preliminarily prepared for subsequent assembly with the wood sheets. A suitable base, such as paper or fabric, is impregnated with a dispersion prepared as described above, and the resultant impregnated sheet is allowed to dry for subsequent use as the adhesive layer in laminated structures. In this case the proportion of acetylene black may be as low as 3% of the total resin by weight and need not exceed 40%. Alternatively, an aqueous dispersion of acetylene black is first applied to a base of fabric or paper and thereafter a dispersion of synthetic resin is applied thereto. The resultant solidified glue film carried by the base is thereafter cured by resistance heating in the manner described in the formation of laminated structures. Figure 3 illustrates a suitable base 6 of paper or the like impregnated with an acetylene black-resin composition 7. Where paper is used as the base the acetylene black may be put in place during or after the manufacture of the paper sheet.

In Figure 4 is illustrated a modification in which the base comprises a woven or knitted fabric having a mesh size preferably not finer than about 20 mesh openings to the linear inch, nor coarser than about 4 mesh openings to the linear inch after impregnation. The threads 8 of the fabric 9 are impregnated with the suspension of acetylene black and synthetic resin in water. This provides the electric conductor with the required resistance and in use it is placed in the glue line between adjacent adhesive-coated faces of the laminated structure. In an illustrative example 100 parts by weight of fabric were impregnated with 500 parts of the resin-black mixture containing 22% by weight of acetylene black. The heat generated by passage of the current through the fabric was adequate to quickly and uniformly cure the adhesive resin. The portion of resin within the meshes of the fabric although non-conductive in itself is heated as well as that immediately surrounding the conductive strands.

The invention has application to the production of laminated structures from thin porous sheets of fabric, paper or asbestos. The fabric sheets may be made from normal textile materials or from glass or asbestos. Heretofore it has only been possible to produce structures up to a certain maximum thickness beyond which sufficient heat transfer from platens was not possible. Referring to Figure 5, a plurality of sheets 10 of paper or fabric are impregnated with an acetylene black-resin dispersion 11, as described, and assembled in laminated form as shown. Sheet electrodes 12 are placed at the top and bottom of the structure, and the assembly is cured by passing a current through the thickness of the structure.

It will be apparent that the invention described has application in the curing of synthetic resin in many fields such as, plywood arch constructions, trestle timbers for roads and bridges, railroad ties, keels and framing members for ship construction, aircraft wing spars, propellers, compregnated wood, joining cured resin surfaces, etc.

We claim:

1. A method of forming laminated structures which comprises mixing acetylene black with a synthetic resin adhesive in the proportions of 20 to 100 parts of acetylene black per 100 parts of adhesive to give the mixture direct current resistance without destroying its adhesive properties, incorporating the mixture with the laminae, assembling the latter in a press, applying pressure thereto and passing an electric current by direct conduction through the adhesive to generate heat therein and set the assembly.

2. In the manufacture of laminated structures utilizing a synthetic resin adhesive, the steps which comprise uniformly incorporating acetylene black in the adhesive in such manner as to substantially retain the structural form of the acetylene black particles and in proportions of 20 to 100 parts acetylene black per 100 parts resin to render said adhesive electrically conductive at an applied voltage of 110 to 220 volts, assembling laminae with a layer of said adhesive therebetween, mechanically connecting electrical conductors directly to opposite edges of said layer, and passing an electric current through said layer by means of said conductors to generate heat by electrical resistance in said layer to cure the same.

WILFRED GALLAY.
GERALD GILBERT GRAHAM.